US006970716B2

(12) United States Patent
Rune et al.

(10) Patent No.: US 6,970,716 B2
(45) Date of Patent: Nov. 29, 2005

(54) POWER CONTROL FOR DOWNLINK SHARED CHANNEL IN RADIO ACCESS TELECOMMUNICATIONS NETWORK

(75) Inventors: Göran Rune, Linköping (SE); Gert-Jan van Lieshout, Apledoorn (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 857 days.

(21) Appl. No.: 09/789,716

(22) Filed: Feb. 22, 2001

(65) Prior Publication Data
US 2002/0115460 A1 Aug. 22, 2002

(51) Int. Cl.$^7$ .......................... H04M 1/00; H04B 7/216
(52) U.S. Cl. ...................................... 455/552; 370/335
(58) Field of Search ...................... 370/355; 455/522, 455/422

(56) References Cited

U.S. PATENT DOCUMENTS

| | | | |
|---|---|---|---|
| 5,056,109 A | 10/1991 | Gilhousen et al. |
| 5,107,487 A | 4/1992 | Vilmur et al. |
| 5,267,262 A | 11/1993 | Wheatley, III |
| 5,430,760 A | 7/1995 | Dent |
| 5,491,837 A | 2/1996 | Haartsen |
| 5,551,057 A | 8/1996 | Mitra |
| 5,574,982 A | 11/1996 | Almgren et al. |
| 5,604,730 A | 2/1997 | Tiedemann, Jr. |
| 5,710,982 A | 1/1998 | Laborde et al. |
| 5,715,526 A | 2/1998 | Weaver, Jr. et al. |
| 5,799,005 A | 8/1998 | Soliman |
| 5,893,035 A | 4/1999 | Chen |
| 6,144,861 A | 11/2000 | Sundelin et al. |

(Continued)

FOREIGN PATENT DOCUMENTS

EP 0 680 160 A 11/1995

(Continued)

OTHER PUBLICATIONS

U.S. Provisional Appl. No. 60/260,891, filed Jan. 12, 2001, "Downlink Power Control Of A Common Transport Channel".*

(Continued)

Primary Examiner—William D. Cumming
(74) Attorney, Agent, or Firm—Nixon & Vanderhye, P.C.

(57) ABSTRACT

In a radio access network of a cellular telecommunications system, a radio network controller ($26_1$) sets a nominal power level for use by a base station ($28_{1-1}$) in transmitting a common transport channel (used for transporting data) over the air interface (32) in a cell for a connection involving a user equipment unit (30). The nominal power level is set by the radio network controller independently of whether the base station supports a differentiated power control scheme (i.e., a power control scheme which allows the base station selectively to adjust the nominal power level, e.g., in accordance with information received from the user equipment unit). In the illustrated embodiments, the differentiated power control scheme allows the base station selectively to adjust the nominal power level in accordance with whether the cell served by the base station is a primary cell or a non-primary cell for the connection with the user equipment unit. When the cell is a primary cell, the base station adjusts the nominal power level by subtracting an offset value from the nominal power level to determine the power level used for actual transmission of data for the common transport channel over the air interface. In differing embodiments, the offset value is acquired either from the radio network controller or is configured locally at the base station. In one mode of the invention, the radio network controller sets the nominal power level using a user plane frame protocol between the base station and the radio network controller. In an example implementation, the common transport channel is a DSCH channel in a UTRAN network.

30 Claims, 10 Drawing Sheets

U.S. PATENT DOCUMENTS

| | | | |
|---|---|---|---|
| 2002/0001292 A1 * | 1/2002 | Miyamoto | 370/335 |
| 2002/0094833 A1 * | 7/2002 | Lieshout et al. | 455/522 |
| 2002/0115460 A1 * | 8/2002 | Rune et al. | 455/522 |

FOREIGN PATENT DOCUMENTS

| | | |
|---|---|---|
| EP | 0 682 419 A | 11/1995 |
| EP | 0 809 365 A | 11/1997 |
| EP | 0 940 930 A | 9/1999 |
| EP | 1 067 708 A1 | 1/2001 |
| WO | 97/02665 | 1/1997 |
| WO | 97/26716 A | 7/1997 |
| WO | WO 98/56120 | 10/1998 |
| WO | 98/56200 | 12/1998 |
| WO | 99/08398 A | 2/1999 |
| WO | 99/31819 A | 6/1999 |
| WO | 99/41850 | 8/1999 |
| WO | 99/52310 A | 10/1999 |
| WO | 00/55976 | 9/2000 |

OTHER PUBLICATIONS

Kemp & Yegani, "Open RAN: A New Architeture for Mobile Wireless Internet Radio Access Networks," IEEE Communications Magazine, pp. 118-123, May 2002.*

"Universal Mobile Telecommunications System (UMTS): UTRAN $I_{ub}$ Interface User Plane Protocols for Common Transport Channel Data Streams", 3GPP TS 25.435, version 3.5.0, Release 1999, ETSI, Dec. 2000.

A. Salmasi et al.: "On the System Design Aspects of Code Division Multiple Access (CDMA) Applied to Digital Cellular and Personal Communications Netwoks," Gateway to the Future—Technology in Motion, St. Louis, May 19-22, 1991, No. Conf. 41, May 19, 1991, pp. 57-62, XP000260154, Institute of Electrical and Electronics Engineers.

Power Control under Soft Handover, FPLMTS Study Committee, Air-interface WG, SWG2, Document No. AIF/SWG2-16-18 (P), Matsushita Communication Industrial Co., Ltd., Mar. 30, 1998.

Power Control under Soft Handover, FPLMTS Study Committee, Air-interface WG,SWG2, Document No. AIF/SWG2-15-2 (C), Matsushita Communication Industrial Co., Ltd., Mar. 11, 1998.

Excerpt from TIA/EIA Interim Standard Mobile Station-Base Station Compatibility Standard for Dual-Mode Wideband Spread Spectrum Cellular System, TIA/EIA/IS-95, Jul. 1993.

TSG-RAN Working Group 1 meeting # 7bis, Kyongju, Korea, Oct. 4-5, 1999 entitled: Adjustment Loop in downlink power control during soft handover.

L. Song et al., Lucent Technologies, Adaptive Power Control Step Size, 1998.

Third Generation Partnership Project (3GPP) Technical Specification 25.211, v.3.5.0 (Dec. 2000) "Physical Channels and Mapping of Transport Channels Onto Physical Channels (FDD)" (Release 1999).

Third Generation Partnership Project (3GPP) Technical Specification 25.435, v.3.5.0 (Dec. 2000), "UTRAN $I_{ub}$ Interface User Plane Protocols for Common Transport Channel Data Streams." (3GPP TS 24.435 version 3.5.0 Release 1999).

U.S. Provisional Appl. No. 60/260,891, filed Jan. 12, 2001, entitled "Downlink Power Control Of A Common Transport Channel".

Third Generation Partnership Project (3GPP) Technical Specification 25.331, v.3.5.0 (Jan. 2000) "RRC Protocol Specification." (3G TS 25.331 version 3.1.0 Release 1999).

* cited by examiner

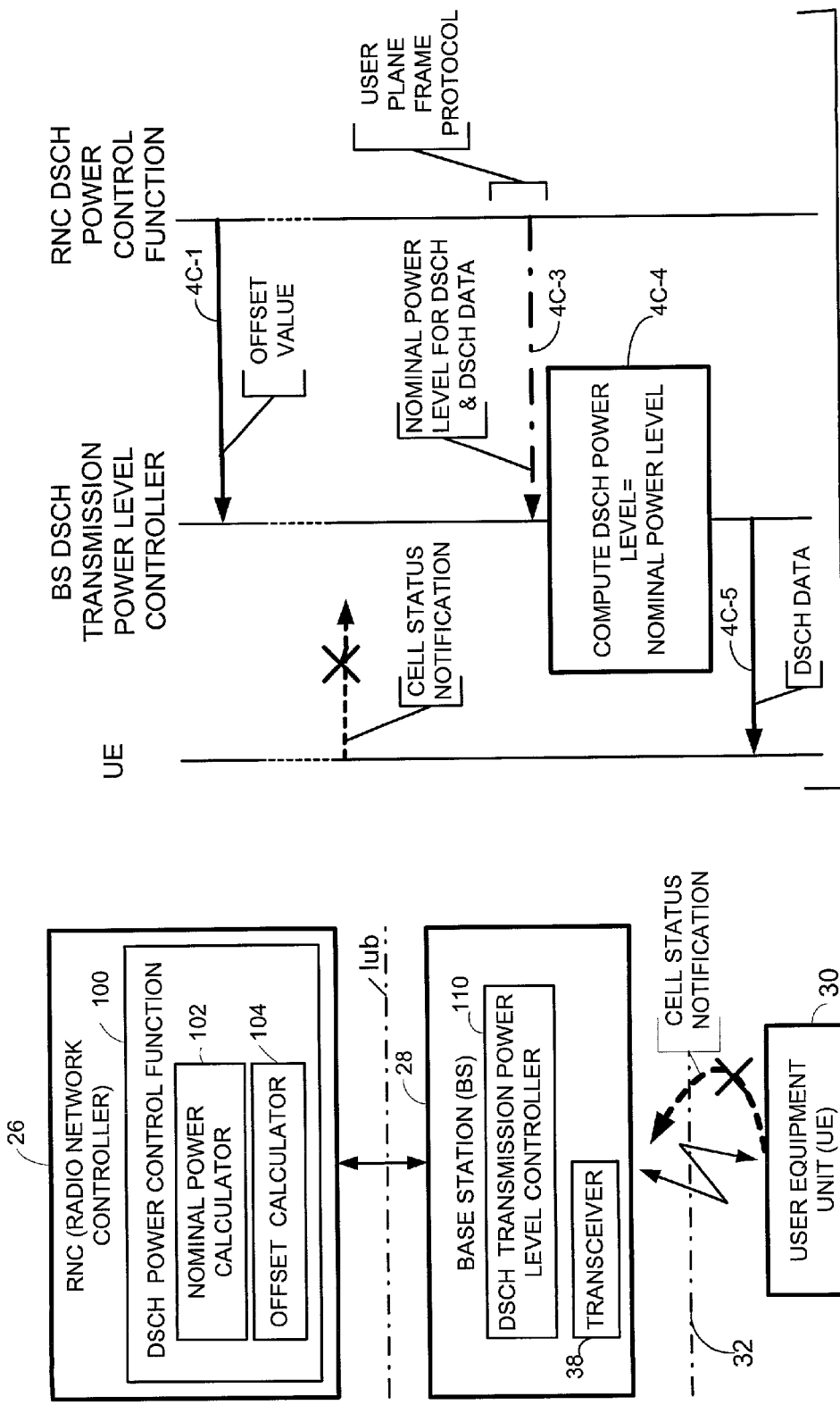

POWER CONTROL FOR DOWNLINK SHARED CHANNEL IN RADIO ACCESS TELECOMMUNICATIONS NETWORK

BACKGROUND

1. Field of the Invention

The present invention pertains to wireless telecommunications, and particularly to power control for transmitting over a downlink shared (e.g., common) chananel in a radio access network of a wireless (e.g., cellular) telecommunications system.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks)

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419 (International Publication Number WO 95/15665). An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC system or DRNS.

On the radio interface, two groups of physical channels are defined: Dedicated physical channels and Common/Shared physical channels. Dedicated physical channels are used for transporting information between one user equipment unit (UE) and the core node (CN). In other words, the physical channels are dedicated to a certain user equipment unit (UE). Common/shared physical channels, on the other hand, can be used by multiple user equipment units (UEs) based on some kind of multiplexing. Multiplexing technologies used include both code and time division multiplexing.

The dedicated physical channel is further divided into the dedicated physical data channel (DPDCH) and the dedicated physical control channel (DPCCH). The former carries the user data and the latter carries control information related to the radio connection, e.g. information on what data rate is currently used etc. For more details on the physical channels see one or more of the following specifications (all of which are incorporated herein by reference in their entirety): (1) Third Generation Partnership Project (3GPP) Technical Specification 25.211, v.3.5.0 "Physical Channels and Mapping of Transport Channels Onto Physical Channels (FDD)"; (2) Third Generation Partnership Project (3GPP) Technical Specification 25.221, v.3.5.0 "Physical Channels and Mapping of Transport Channels Onto Physical Channels (TDD)."

In many radio access network (RAN) technologies, e.g. GSM, the user equipment unit (UE) will at any moment in time normally only exchange information with one RAN cell. This corresponds to having one radio link over the radio interface. When the user equipment unit (UE) moves from a first cell to a second cell in such a radio access network, the user equipment unit (UE) switches from the first cell to the second cell in an operation referred to as a "hard handover".

However in other RAN technologies (e.g. WCDMA) it is possible for the user equipment unit (UE) to have information exchanged with several RAN cells. In such a RAN, when a UE is in an area where both the first cell and the second cell have coverage, the UE can have radio links to both the first cell and the second cell during a longer period. Both radio links will normally transport the same information and the UE (downlink) or RAN (uplink) can combine the information received over the different radio links in the best possible way. As noted above, the situation of having multiple radio links to one UE is often called "soft handover".

The UTRAN supports a soft handover situation for dedicated physical channels only. As a result, if a UE is receiving both dedicated and shared physical channels, it can receive the dedicated channels from multiple UTRAN cells in parallel, whereas it will receive the shared channel information only via one UTRAN cell.

If a DRNC is providing resources for a UE-CN connection, there is a large difference in DRNC control for the two types of physical channels. For dedicated physical channels, the DRNC is involved in admission control at establishment of the UE-CN connection via its DRNS resources. When the DRNC has admitted the UE-CN connection to use its resources, the DRNC is no longer directly involved in the scheduling of the physical channel resources for the UE-CN connection. This task is performed by the SRNC. The DRNC might inform the SRNC about local conditions like a congestion situation and e.g. ask the SRNC to lower the information rate on the dedicated physical channel.

For common/shared physical channels, the DRNC is involved in admission control at establishment of the UE-CN connection via its DRNS resources. In addition, since this is a common/shared physical channel used by multiple UEs using this base station, the DRNC is continuously performing the final scheduling of the resources on the physical channel.

In the downlink direction from the radio access network (RAN) to the user equipment unit (UE), due to the scheduling in the DRNC, the UE will normally not know which common/shared physical channel resources will be used by the RAN for its UE-CN connection at each moment in time. In order to overcome this uncertainty, the UE can either listen to all common/shared physical channel resources and detect which resources are used for its UE-CN connection, or the RAN can inform the UE about the common/shared resources used at a certain point in time.

In line with the second solution, the RAN supports a method in which the UE is informed about the common/shared physical channel resources, e.g. the DSCH, used at a certain moment in time on a parallel established dedicated physical channel.

In the Universal Mobile Telecommunications (UMTS) Terrestrial Radio Access Network (UTRAN), on the radio interface there are Common Transport Channels and Dedicated Transport Channels. The Common Transport Channels are the uplink Random Access Channel (RACH), the downlink Forward Access Channel (FACH), uplink Common Packet Channel (CPCH), Uplink Shared Channel (USCH), and Downlink Shared Channel (DSCH). The Dedicated Transport Channels are the Dedicated Channel (DCH). The transport channels in the UMTS are described in one or more of the following specifications (all of which are incorporated herein by reference in their entirety): (1) Third Generation Partnership Project (3GPP) Technical Specification 25.211, v.3.5.0 "Physical Channels and Mapping of Transport Channels Onto Physical Channels (FDD)"; (2) Third Generation Partnership Project (3GPP) Technical Specification 25.221, v.3.5.0 "Physical Channels and Mapping of Transport Channels Onto Physical Channels (TDD)"; (3) Third Generation Partnership Project (3GPP) Technical Specification 25.331, v.3.5.0 "RRC Protocol Specification."

The common transport channel (DSCH) is used for transporting data to many different UEs. The multiplexing is achieved by informing the UE about the DSCH resources, used at each moment in time for transmissions towards this UE, on the established dedicated physical channel in parallel with the DSCH.

The CRNC (assuming the role as DRNC for a UE) schedules the data received from the SRNC for the different UBs on the DSCH transport channel. When scheduling the DSCN data transmission the CRNC decides the power level to be used for each DSCH data sent towards the UE. This power level is indicated to the base station in the user plane frame protocol between the CRNC and the base station. In the Release '99 specifications the CRNC indicates an offset towards the power level of the Primary CPICH-. The power level of the Primary CPICH is fixed and known by both the CRNC and the BS (decided by the CRNC when configuring a cell). For more details on the user plane frame protocol between the CRNC and the base station used for the DSCH see Third Generation Partnership Project (3GPP) Technical Specification 25.435, v.3.5.0 "UThAN Iub Interface User Plane Protocols for Common Transport Channel Data Streams."

Site Selection Diversity Transmit power control (SSDT) is a scheme whereby a user equipment unit (UE) in soft handover can inform the cells (base stations) that it is connected to, which one of them is regarded as the primary (best) cell and consequently that the other cells that it is connected to are the secondary cells (non-primary). This scheme is defined such that normally a base station transmits both the DPDCH and the DPCCH in the downlink. However, for non-primary, cells the network may reduce (or switch off) the power in the downlink such that only the DPCCH is transmitted.

In the 3GPP specifications for Release '99 the power of the DSCH is set by the RNC scheduling the DSCH data, i.e. the CRNC. However, the CRNC does not have any information on whether or not the cell carrying the DSCH is the primary or a non-primary cell.

In the 3GPP Release 4 it is proposed to improve this power control such that the network may use SSDT information to decide the final power level of the DSCH. This would result in a possibility to have a lower power level if the cell carrying the DSCH is the primary cell and a higher power level if the cell carrying the DSCH is a non-primary cell. Note that the DSCH is not used in soft handover, but will always only be present on one radio link.

The current proposal discussed in 3GPP RAN3 for the network control is that the CRNC provides the base station with a power offset ($P_{DSCH\text{-}secondary}$) to be used if the cell is a non-primary cell. This means that if the power level indicated in the user plane frame protocol is $P_{DSCH}$ then the following power levels would apply:

The DSCH is carried by the primary cell: $P_{DSCH}$

The DSCH is carried by a non-primary cell: $P_{DSCH} + P_{DSCH\text{-}secondary}$ The mechanism proposed in 3GPP is to signal the power offset ($P_{DSCH\text{-}secondary}$) to be used if the cell is a non-primary cell ($P_{DSCH\text{-}secondary}$) from the CRNC to the base station when establishing a DSCH.

Since the CRNC does not know whether or not the base station supports the improved DSCH power control scheme (based on this additional offset) the support for this feature has to be signalled back to the CRNC. If the base station informs the CRNC that it is capable of this new feature then the CRNC shall set the power level in the scheduled data in the user plane such that the resulting power is PDSCH. If, on the other hand, the base station informs the CRNC that it does not support this new feature then the CRNC shall set the power level in the scheduled data in the user plane such that the resulting power is $P_{DSCH} + P_{DSCH\text{-}secondary}$. This to ensure a sufficient power level if the DSCH happens to be carried by a non-primary cell.

The solution currently proposed for 3GPP Release 4 has the drawback that the control of the mechanism becomes unnecessarily complex. The CRNC needs to wait for information on whether or not the base station supports the new power control scheme for the DSCH before it can decide what power level to set on the DSCH (in the user plane).

What is needed, therefore, and an object of the present invention, is a simplified power control scheme for the DSCH.

BRIEF SUMMARY OF THE INVENTION

In a radio access network of a cellular telecommunications system, a radio network controller sets a nominal power level for use by a base station in transmitting a common transport channel (used for transporting data) over the air interface for a connection involving a user equipment unit. The nominal power level is set by the radio network controller independently of whether the base station supports a differentiated power control scheme (i.e., a power control scheme which allows the base station selectively to adjust the nominal power level, e.g., in accordance with information received from the user equipment unit).

In the illustrated embodiments, the differentiated power control scheme allows the base station selectively to adjust the nominal power level in accordance with whether the cell involved in the connection with the user equipment unit is a primary cell or a non-primary cell. In particular, the base station transmits data for the common transport channel over the air interface for the connection at the nominal power level set by the radio network controller if the cell is not a primary cell for the connection or if the base station does not support the differentiated power control scheme. Alternatively, the base station transmits data for the common transport channel for the connection at a reduced power level which is less than the nominal power level if the base station does support the differentiated power control scheme and if the cell is a primary base station for the connection with the user equipment unit.

The base station subtracts an offset value from the nominal power level to determine the reduced power level used for actual transmission of data for the common transport channel over the air interface. In differing embodiments, the offset value is acquired in different ways. For example, in one embodiment the radio network controller communicates the offset value to the base station. In another embodiment, the base station is configured locally with the offset value.

In one mode of the invention, the radio network controller sets the nominal power level using a user plane frame protocol between the base station and the radio network controller. In an example implementation, the common transport channel is a DSCH channel in a UTRAN network.

In one of its aspects the invention concerns a base station which has a power level determination unit or transmission power level controller which determines a power level at which the base station is to transmit data to the user equipment unit over the air interface for a common transport channel in a cell utilized by the connection. The power level determination unit selectively uses the power offset value to determine the power level. The power level determination unit uses the power offset value to determine the power level if the cell utilized is a primary cell for the connection, but does not use the power offset value to determine the power level if the cell is a non-primary (e.g., secondary) cell for the connection. The offset value can be acquired from the radio network controller or locally configured at the base station.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3C is a block view of portions of the UMTS Radio Access Network of FIG. 2, and particularly showing a scenario with a base station not having a differentiated power control scheme.

FIG. 4C is a diagrammatic view showing certain example messages transmitted in the scenario of FIG. 3C.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
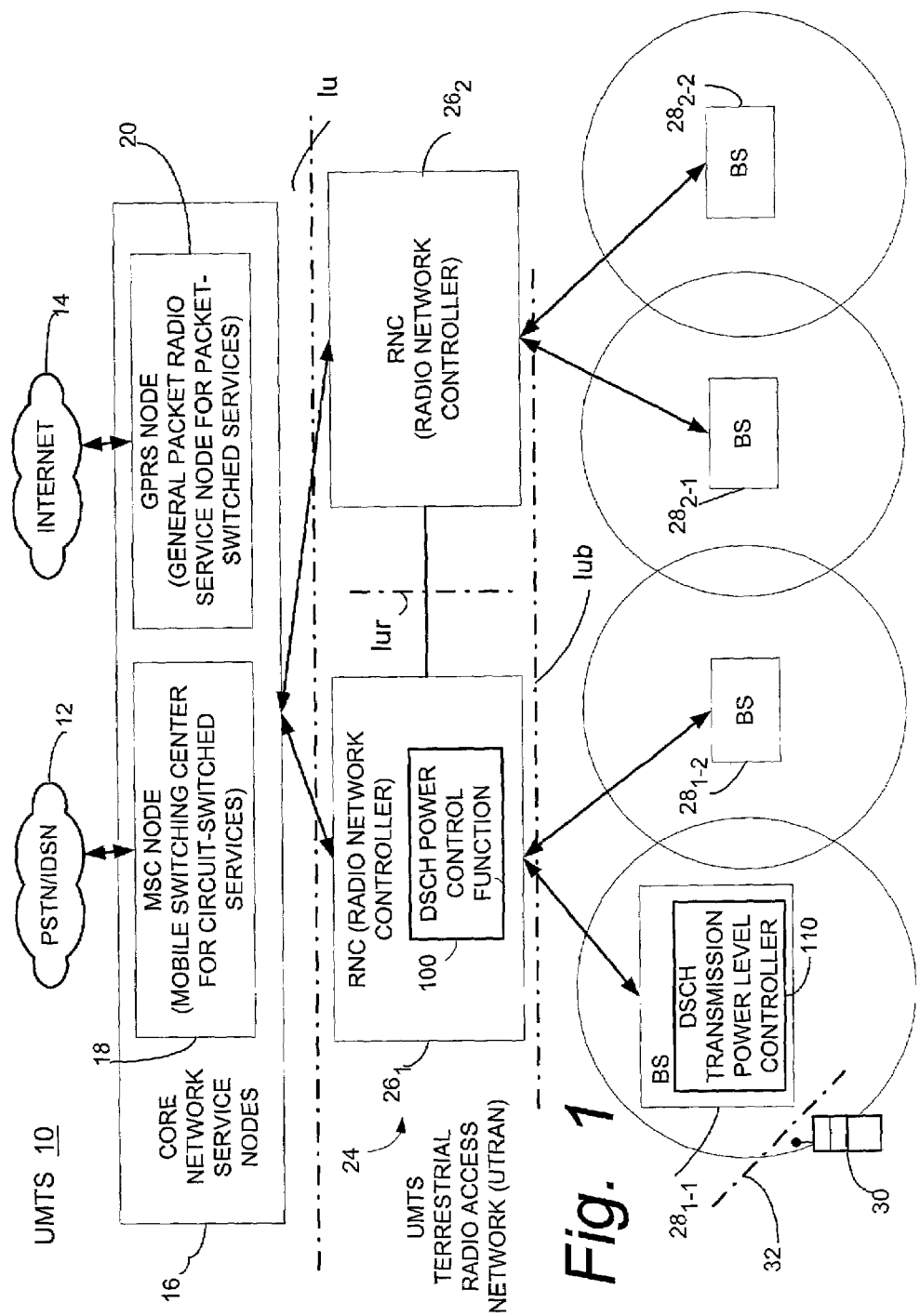
FIG. 1 is diagrammatic view of example mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly serving radio network controller (SRNC) $26_1$ and drift radio network controller (DRNC) $26_2$. Each RNC 26 is connected to a plurality of base stations (BS) 28. For example, and again for sake of simplicity, two base station nodes are shown connected to each RNC 26. In this regard, SRNC $26_1$ serves base station $28_{1-1}$ and base station $28_{1-2}$, while SRNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

In the illustrated embodiments, each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 1, communicates with one or more cells or one or more base stations (BS) 28 over a radio or air interface 32. Each of the radio interface 32, the Iu interface, the Iub interface, and the Iur interface are shown by dash-dotted lines in FIG. 1. At the time shown in FIG. 1, the user equipment unit (UE) 30 has a connection leg $100_{2-1}$ through base station $28_{2-1}$. The cell served by base station $28_{2-1}$ is in the DRNS of drift radio network controller (DRNC) $26_2$. Although not shown in FIG. 1, the connection involving user equipment unit (UE) 30 may have other legs, i.e., one or more legs in base stations controlled by serving radio network controller (SRNC) $26_1$. For example, there may be another leg of the connection involving user equipment unit (UE) 30 through base station $28_{1-2}$.

The transport channels, physical channels, and logical channels are utilized in the UMTS Terrestrial Radio Access Network (UTRAN) 24 of FIG. 1. Among the common transport channels utilized over the radio interface Uu are the RACH and FACH common transport channels. Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Figure 2:
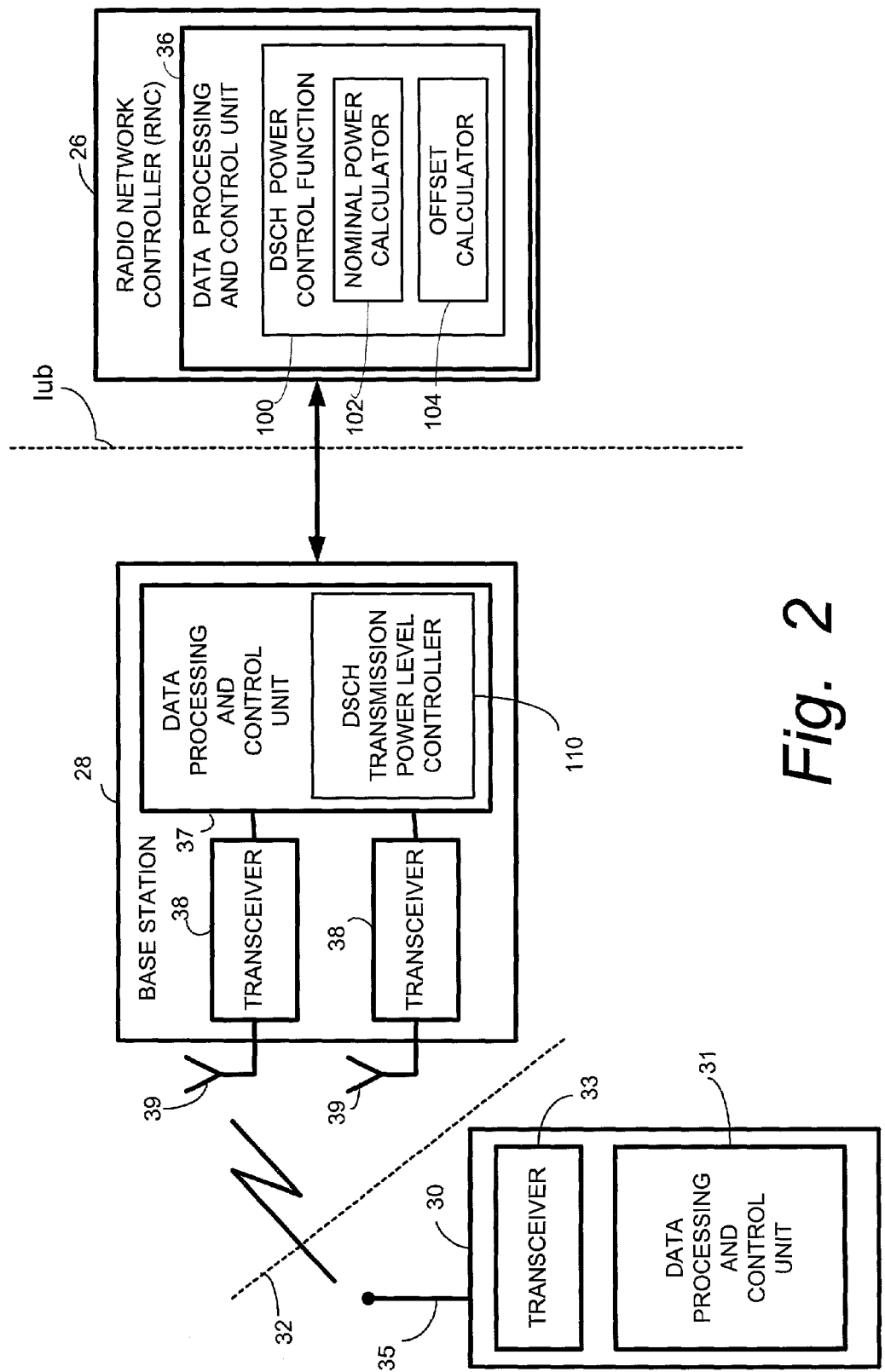
FIG. 2 is a simplified function block diagram of a portion of a UMTS Terrestrial Radio Access Network, including portions of a user equipment unit (UE) station; a radio network controller; and a base station.

FIG. 2 shows selected general aspects of user equipment unit (UE) 30 and illustrative nodes such as radio network controller 26 and base station 28. The user equipment unit (UE) 30 shown in FIG. 2 includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 2 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In one of its various aspects, the present invention particularly concerns an improved technique whereby a radio network controller (such as radio network controller $26_1$ in FIG. 1) sets a nominal power level for use by a base station use in transmitting a common transport channel (used for transporting data) over the air interface for a connection involving a user equipment unit. The nominal power level is set by the radio network controller independently of whether the base station supports a differentiated power control scheme (i.e., a power control scheme which allows the base station selectively to adjust the nominal power level, e.g., in accordance with information received from the user equipment unit).

In the illustrated, non-limiting example embodiments, the radio network controller (RNC) $26_1$ includes a DSCH power control function 100. As shown in FIG. 2, the DSCH power control function 100 has a nominal power calculator 102. In one embodiment of the invention, DSCH power control function 100 also includes an offset calculator 104. The nominal power calculator 102 sets the nominal power level for use by a base station (such as base station $28_{1-1}$) in transmitting a common transport channel (used for transporting data, e.g., the DSCH) over the air interface 32 for a cell involved in the connection with user equipment unit (UE) 30. That nominal power level is communicated to the base station $28_{1-1}$. When included in DSCH power control function 100, the offset calculator 104 determines an offset value which is communicated to base station $28_{1-1}$.

There are various criteria that can be used by nominal power calculator 102 in determining the nominal power level for a cell. Techniques of such determination and examples of factors that may be considered in regulating the transmit power on a common transport channel are described, e.g., in U.S. Provisional Patent Application Ser. No. 60/260,891 filed Jan. 12, 2001, entitled "Downlink Power Control Of A Common Transport Channel", which is incorporated herein by reference in its entirety.

The base station $28_{1-1}$ includes a DSCH transmission power level controller 110 which, upon reception of the nominal power level set by radio network controller (RNC) $26_1$, computes or otherwise determines an actual power level utilized by the appropriate radio transceivers 38 of base station $28_{1-1}$ in transmitting the DSCH for the cell over air interface 32 to user equipment unit (UE) 30. In the illustrated embodiments, the differentiated power control scheme facilitated by DSCH transmission power level controller 110 determines or sets the actual power level for the cell by selectively adjusting the nominal power level. The selective adjustment of the nominal power level depends on whether the cell is designated as a primary cell or a non-primary cell for the connection with user equipment unit (UE) 30. In particular, the DSCH transmission power level controller 110 of base station $28_{1-1}$ sets the actual power level for the DSCH for the cell involved in the connection at the nominal power level set by radio network controller (RNC) $26_1$, if the cell is a primary cell for the connection. Alternatively, the DSCH transmission power level controller 110 of base station $28_{1-1}$ sets the actual power level for the DSCH for the cell involved in the connection at a reduced power level (e.g., less than the nominal power level) if the cell is a primary cell for the connection with user equipment unit (UE) 30. In this latter regard, the base station $28_{1-1}$ subtracts an offset value from the nominal power level to determine the reduced power level used for the actual power level for transmission of data for the common transport channel over air interface 32.

In differing embodiments, the offset value is acquired in different ways. For example, in one embodiment the offset calculator 104 of DSCH power control function 100 sets the offset value which is communicated by radio network controller (RNC) $26_1$, to base station $28_{1-1}$. In another embodiment illustrated in FIG. 3D and FIG. 4D, the base station is configured locally with the offset value. The DSCH is transmitted by the appropriate radio transceiver 38 and antenna 39 at the actual power level over air interface 32 to user equipment unit (UE) 30.

In the WCDMA specifications developed by 3GPP, the DSCH for one user equipment unit (UE) can only be connected in one cell at a time. However, the DSCH will be established together with dedicated transport channels which may be in a soft handover situation. In a soft handover situation the DSCH may be "moved" from one cell to another to allow the DSCH to be connected via the "best" cell. This would mean that, before "moving" the DSCH, data would be communicated via base station $28_{1-1}$ and after the move via base station $28_{1-2}$ even though the user equipment unit (UE) would at the same time be connected in soft handover using dedicated transport channels in cell in both base station $28_{1-1}$ and base station $28_{1-2}$. The person skilled in the art will understand that, despite the cell in base station $28_{1-2}$ being regarded as the "best" cell by the network, whether or not the cell in base station $28_{1-2}$ is the primary or the secondary cell is decided by the UE and signaled to the network.

In the WCDMA specifications developed by 3GPP the DSCH for one UE can only be connected in one cell at a time. However, in soft handover situation the DSCH may be "moved" from one cell to another to allow the DSCH to be connected via the "best" cell. This would mean that before "moving" the DSCH the nominal power (and the DSCH data) would be communicated via BS $28_{1-1}$ and after the move via BS $28_{1-2}$ even though the UE would at the same time be connected in soft handover using dedicate transport channels via both BS $28_{1-1}$ and BS $28_{1-2}$.

In the example, non-limiting scenarios herein described and generically depicted in FIG. 1 and FIG. 2, for example, the DSCH power control function 100 is performed by data processing and control unit 37 of radio network controller (RNC) $26_1$ and the DSCH transmission power level controller 110 is performed by data processing and control unit 36 of base station $28_{1-1}$. However, both the DSCH power control function 100 and the DSCH transmission power level controller 110 can be implemented in various alternative ways, alone or in combination, including using individual hardware circuits, using software functioning in conjunction with a suitably programmed digital microprocessor or general purpose computer, using an application specific integrated circuit (ASIC), and/or using one or more digital signal processors (DSPs).

In one mode of the invention, the radio network controller sets the nominal power level using a user plane frame protocol between the base station and the radio network controller. In an example implementation, the common transport channel is a DSCH channel in a UTRAN network.

Figure 4A:
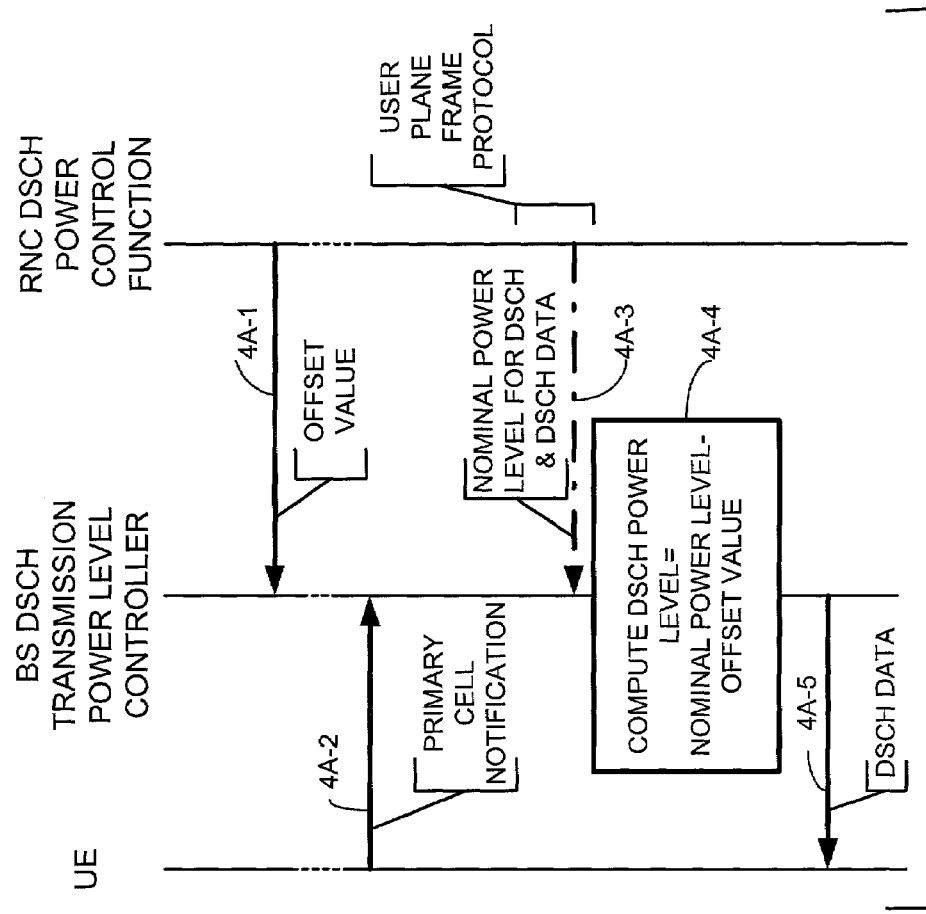
FIG. 4A is a diagrammatic view showing certain example messages transmitted in the scenario of FIG. 3A.
Figure 3A:
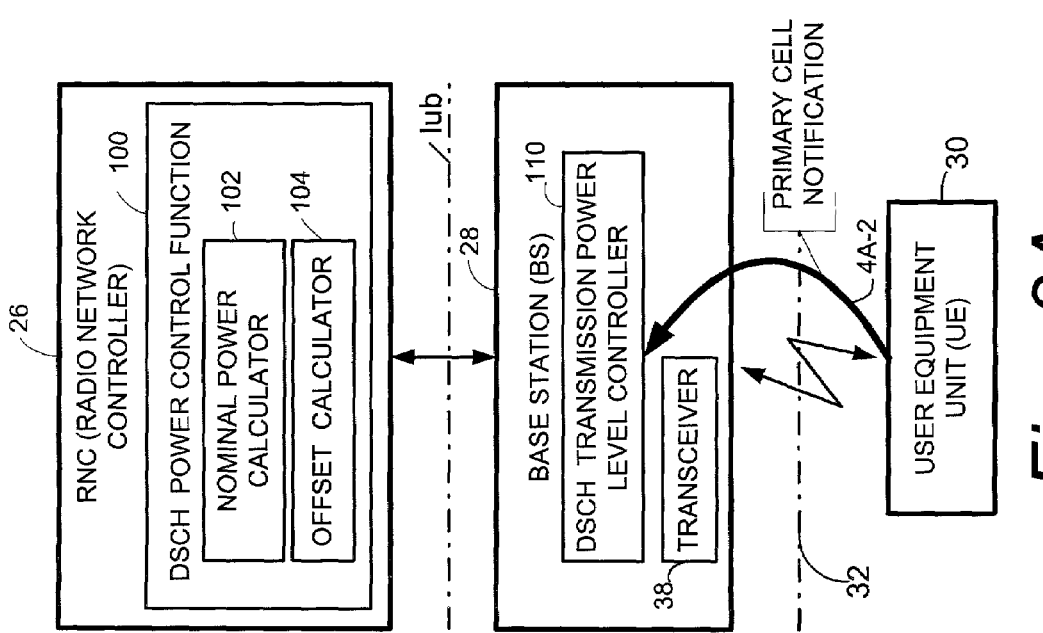
FIG. 3A is a block view of portions of the UMTS Radio Access Network of FIG. 2, and particularly showing a scenario in which a cell involved in the connection with a user equipment unit (UE) 30 is designated as a primary cell and is served by a base station having a differentiated power control scheme.

FIG. 3A shows an example scenario in which a cell involved in the connection with user equipment unit (UE) 30 is designated as a primary cell and is served by base station $28_{1-1}$ having a differentiated power control scheme. FIG. 4A shows certain example messages transmitted in the scenario of FIG. 3A.

In the scenario of FIG. 3A and FIG. 4A, as message 4A-1 radio network controller (RNC) $26_1$ downloads to base station $28_{1-1}$ an offset value to be utilized in determining an actual power level for transmission of the DSCH utilized in the cell involved with the connection with equipment unit (UE) 30. In the scenario of FIG. 3A and FIG. 4A, the offset value is determined by offset calculator 104 (see FIG. 2) of DSCH power control function 100. Preferably, in this and other embodiments herein illustrated, the offset value message 4A-1 is sent in the control plane. However, in yet other embodiments the offset value message 4A-1 can instead be sent in the user plane.

Subsequently, at an appropriate time user equipment unit (UE) 30 notifies base station $28_{1-1}$ that the cell involved with the connection with user equipment unit (UE) 30 is a primary cell for the connection. Such notification is depicted by message 4A-2 in FIG. 3A and FIG. 4A. The notification of message 4A-2 is in accordance with the aforementioned Site Selection Diversity Transmit power control (SSDT) scheme, and accordingly is not described in detail herein.

FIG. 4A further shows radio network controller (RNC) $26_1$ transmitting, as message 4A-3, a nominal power level for the DSCH utilized in the primary cell for user equipment unit (UE) 30 to base station $28_{1-1}$. In FIG. 4A, message 4A-3 is depicted by a dot-dashed line to reflect the fact that this message is transmitted using a user plane frame protocol between base station $28_{1-1}$ and radio network controller (RNC) $26_1$. Being in the user plane frame protocol, the message 4A-3 also carries the DSCH data from radio network controller (RNC) $26_1$ to base station $28_{1-1}$.

Event 4A-4 of FIG. 4A shows base station $28_{1-1}$ computing the actual DSCH power level for the DSCH in the primary cell utilized by the connection with user equipment unit (UE) 30. In the scenario of FIG. 3A and FIG. 4A, the DSCH transmission power level controller 110 of base station $28_{1-1}$ uses utilizes the power offset value of message 4A-2 to compute or determine the actual power level. In particular, as shown by event 4A-4, DSCH transmission power level controller 110 of base station $28_{1-1}$ subtracts the power offset value (obtained via message 4A-2) from the nominal power value (obtained via message 4A-3) to determine the actual power level. The power level as determined at event 4A-4 is utilized to set the actual power level of radio transceiver 38. The radio transceiver 38 then transmits the DSCH data from base station $28_{1-1}$ to user equipment unit (UE) 30 over air interface 32 using the actual power level, as indicated by event 4A-5 in FIG. 4A.

It should be understood that certain timing sequences shown in FIG. 4A and similar diagrams herein are not strictly sequential, as (for example) the message 4A-1 can be transmitted after the transmission of message 4A-2 (even though the ordering of message 4A-1 before message 4A-2 is likely the normal situation).

Figures 3B, 4B:
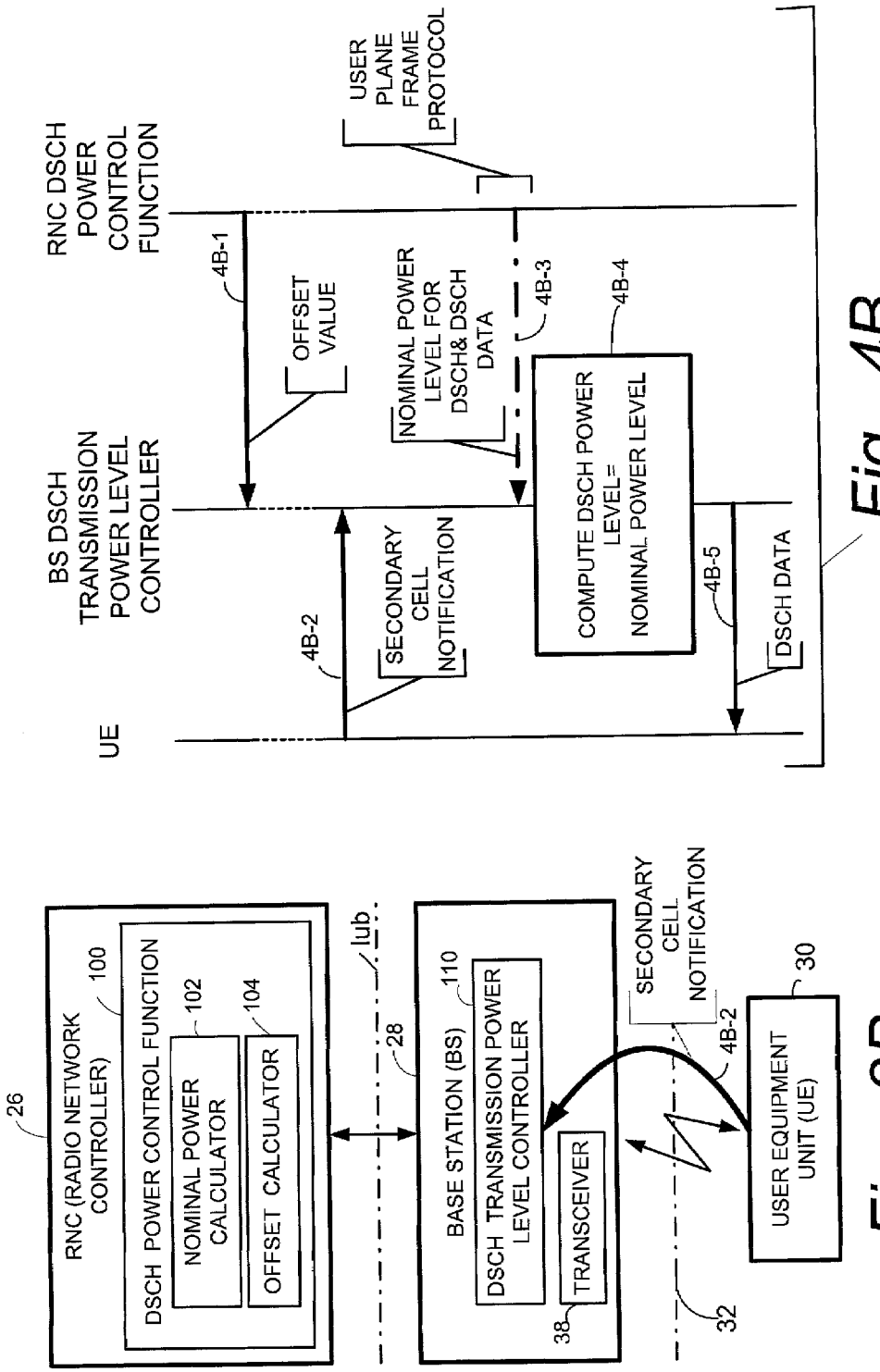
FIG. 3B is a block view of portions of the UMTS Radio Access Network of FIG. 2, and particularly showing a scenario in which a cell involved in the connection with a user equipment unit (UE) 30 is designated as a secondary or non-primary cell and is served by a base station having a differentiated power control scheme.
FIG. 4B is a diagrammatic view showing certain example messages transmitted in the scenario of FIG. 3B.

FIG. 3B shows an example scenario in which a cell involved in the connection with user equipment unit (UE) 30 is designated as a non-primary or secondary cell and is served by base station $28_{1-1}$ having a differentiated power control scheme. FIG. 4B shows certain example messages transmitted in the scenario of FIG. 3B.

The scenario of FIG. 3B and FIG. 4B differs from that of FIG. 3A and FIG. 4A in that notification message 4B-2 advises base station $28_{1-1}$ that the cell involved in the connection with user equipment unit (UE) 30 is a non-primary cell (e.g., a secondary cell). In view of such notification, as event 4B-4 DSCH transmission power level controller 110 determines the actual power level for the DSCH for the cell involving connection user equipment unit (UE) 30 in a different manner. Specifically, as event 4B-4 DSCH transmission power level controller 110 uses the nominal power level (communicated via message 4B-3) as the actual power level. The radio transceiver 38 then transmits the DSCH from base station $28_{1-1}$ to user equipment unit (UE) 30 over air interface 32 for the secondary cell using the actual power level, as indicated by event 4B-5 in FIG. 4B. In like manner as the previous scenario, the power level as determined at event 4B-4 is utilized to set the actual power level of radio transceiver 38. The radio transceiver 38 then transmits the DSCH data from base station $28_{1-1}$ to user equipment unit (UE) 30 over air interface 32 using the actual power level, as indicated by event 4B-5 in FIG. 4B.

FIG. 3C shows an example scenario in which base station $28_{1-1}$ does not have a differentiated power control scheme. FIG. 4C shows certain example messages transmitted in the scenario of FIG. 3C.

The fact that base station $28_{1-1}$ does not have or support the differentiated power control scheme is reflected by the fact that the cell status notification message from user equipment unit (UE) 30 is shown in FIG. 3C and FIG. 4C by a broken line which does not reach base station $28_{1-1}$ (an "X" is affixed over such message). In the present invention, the radio network controller (RNC) $26_1$ can be oblivious to the fact that base station $28_{1-1}$ does not have or support the differentiated power control scheme. In fact, in the present invention the radio network controller (RNC) $26_1$ sets its offset value and nominal power level as in like manner with the preceding scenarios, and transmits those values using messages 4C-1 and 4C-3, respectively. The fact that base station $28_{1-1}$ does not have or support the differentiated power control scheme is further depicted by the fact that, as event 4C-4, DSCH transmission power level controller 110 determines the actual power level for the cell involved in the connection to be the nominal power level. The radio transceiver 38 then transmits the DSCH from base station $28_{1-1}$ to user equipment unit (UE) 30 over air interface 32 using the actual power level, as indicated by event 4C-5 in FIG. 4C.

In the scenario of FIG. 3C and FIG. 4C in which the base station does not have or support the differentiated power control scheme, it is more likely that no offset value need be sent from radio network controller (RNC) $26_1$ to base station $28_{1-1}$. Thus, message 4C-1 may optimally be omitted from the scenario of FIG. 4C.

The foregoing three scenarios thus illustrate, in exemplary form, that in the present invention the radio network controller provides the base station with a power offset ($P_{DSCH-primary}$) to be used if the cell is the primary cell. This means that, if the power level indicated in the user plane is $P_{DSCH}$, then the following power levels would apply (as determined by DSCH transmission power level controller 110 at one of the events 4X-4): (1) If the DSCH is carried by the primary cell, the actual power level is $P_{DSCH}-P_{DSCH-primary}$; (2) If the DSCH is carried by a non-primary cell, the actual power level is $P_{DSCH}$.

The power offset to be used if the cell is the primary cell ($P_{DSCH-primary}$) can be signalled from the CRNC to the base station when establishing a DSCH as in the manner of messages 4A-2 through 4C-2 described above. Alternatively, the power offset can be configured by other means (e.g., locally at the base station, as described below).

Since the CRNC does not need to know whether or not the base station supports the improved DSCH power control scheme (based on this additional offset), the CRNC can always set the power level in the scheduled data in the user plane such that the resulting power is $P_{DSCH}$ for non-primary cells. If the base station does not support the improved DSCH power control scheme it will also use this level if the DSCH is carried by the primary cell. If, on the other hand, the base station does support the improved DSCH power control scheme it will set the power level to $P_{DSCH}$–$P_{DSCH\text{-}primary}$ if the cell is the primary cell, thus effectively reducing the power when the cell carrying the DSCH is the primary cell.

Figure 4D:
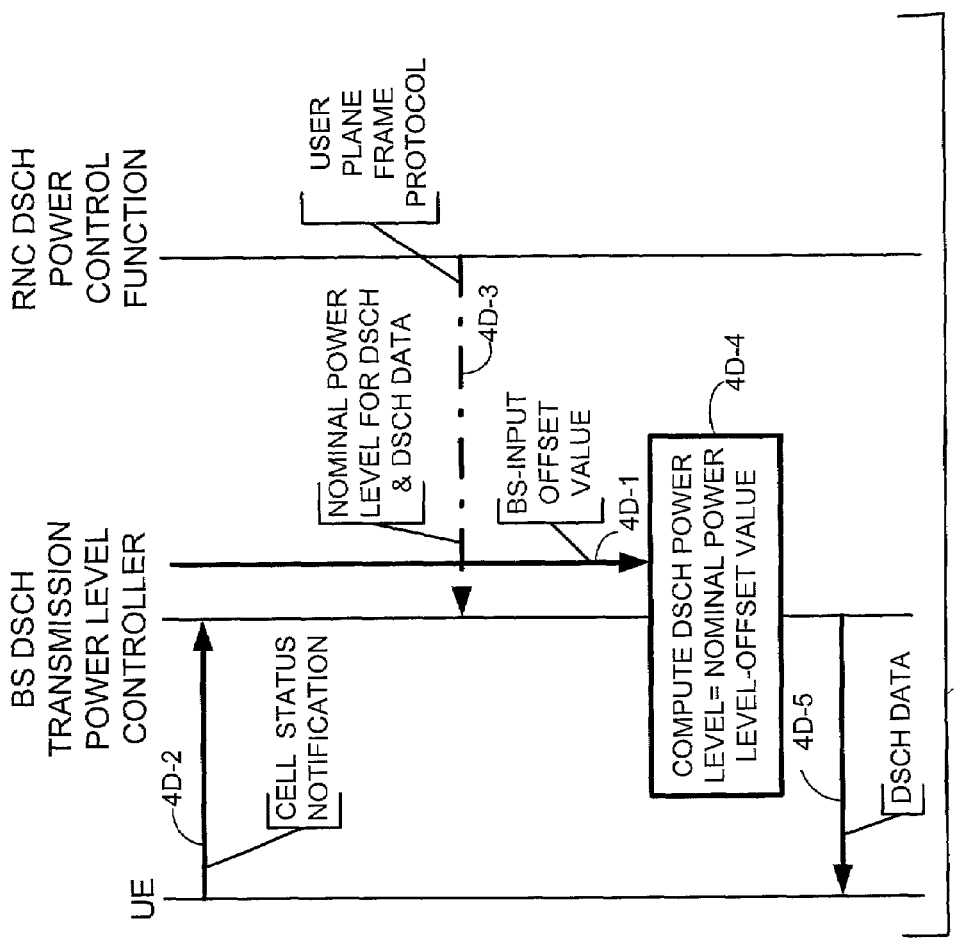
FIG. 4D is a diagrammatic view showing certain example messages transmitted in the scenario of FIG. 3D.
Figure 3D:
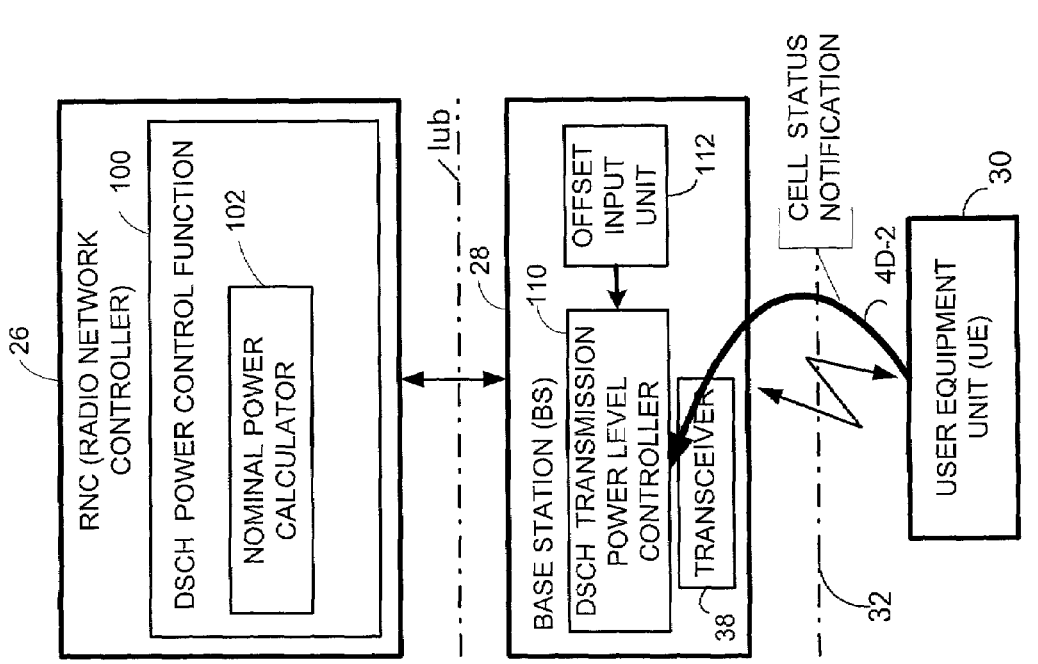
FIG. 3D is a block view of portions of the UMTS Radio Access Network of FIG. 2, and particularly showing a scenario with a base station being configured for base station input of an offset value for use in determining a DSCH transmission power level.

FIG. 3D shows an example scenario in which base station $28_{1\text{-}1}$ is configured for base station input of the offset value for use in determining a DSCH transmission power level. FIG. 4D shows certain example messages transmitted in the scenario of FIG. 3D. In the embodiment and scenario of FIG. 3D and FIG. 4D, DSCH power control function 100 need not have offset calculator 104. Rather, base station $28_{1\text{-}1}$ is provided with an offset input unit 112, as shown in FIG. 3D. The offset input unit 112 enables local input or configuration of the offset value at the base station $28_{1\text{-}1}$, rather than needing communication of the offset value from another network node.

The local input or configuration of the offset value at base station $28_{1\text{-}1}$ can be accomplished in various ways. For example, the offset value can be configured in the base station for instance from a local maintenance terminal, from a remotely located maintenance terminal, or from a network management system possibly via an element management system for the base station). In all these cases the offset value is directly or indirectly controlled by the operator. Indirectly, could for instance be by a function taking local radio conditions into account.

In other respects, the scenario of FIG. 3D and FIG. 4D can resemble either one of the scenario of FIG. 3A and FIG. 4A (in which base station $28_{1\text{-}1}$ is notified that the connection involves a primary cell) or FIG. 3B and FIG. 4B (in which base station $28_{1\text{-}1}$ is notified that the connection involves a non-primary cell). Since either the primary or non-primary case can apply to the scenario of FIG. 3D and FIG. 4D, the cell status notification message 4D-2 of FIG. 3D and FIG. 4D is shown generically. The local input or configuration for the scenario of FIG. 3D and FIG. 4D is shown as event 4D-1 in FIG. 4D. As in the preceding scenarios, the nominal power calculator 102 of DSCH power control function 100 determines the nominal power level to be used for the DSCH, and the radio network controller (RNC) $26_1$ communicates the nominal power level in message 4D-3. As event 4D-4, DSCH transmission power level controller 110 of base station $28_{1\text{-}1}$ determines the actual power level to be used in transmitting the DSCH over the air interface to user equipment unit (UE) 30. In view of its generic representation in FIG. 4D, it should be understood that event 4D-4 can be performed in the manner of event 4A-4 in the event that the cell is the primary cell (e.g., obtaining the actual power level by subtracting the offset value), or in the manner of event 4B-4 in the event that the cell is a non-primary cell (e.g., using the nominal power level as the actual power level). As in the preceding scenarios, the radio transceiver 38 then transmits the DSCH data from base station $28_{1\text{-}1}$ to user equipment unit (UE) 30 over air interface 32 using the actual power level, as indicated by event 4D-5 in FIG. 4D.

As can be seen from the foregoing scenarios, in one of its aspects the invention concerns a base station which has a power level determination unit or transmission power level controller 110 which determines a power level for the base station to transmit data to the user equipment unit in a cell over the air interface for a common transport channel utilized by the connection. The power level determination unit selectively uses the power offset value to determine the power level. The power level determination unit uses the power offset value to determine the power level if the cell involved in the connection with the user equipment unit (UE) is a primary cell (as in the manner of the scenario of FIG. 3A and FIG. 4A), but does not use the power offset value to determine the power level if the cell is a non-primary (e.g., secondary) cell (as in the manner of the scenario of FIG. 3B and FIG. 4B). The offset value can be acquired from the radio network controller or locally configured at the base station (as in the manner of the scenario of FIG. 3D and FIG. 4D).

Figure 4E:
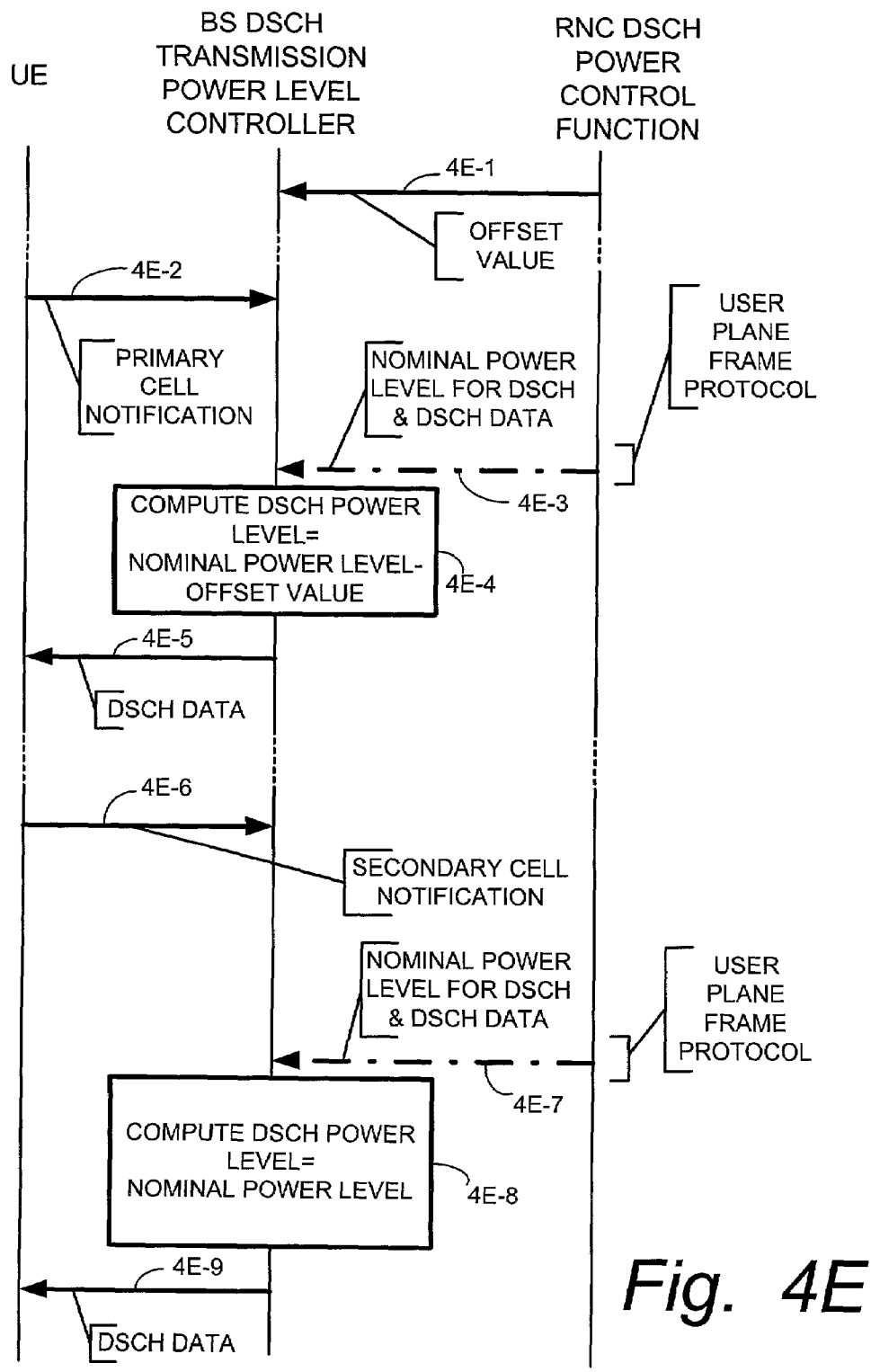
FIG. 4E is a diagrammatic view showing certain example messages transmitted in a scenario which is a hybrid of the scenario of FIG. 3A and the scenario of FIG. 3B.

FIG. 4E shows certain example messages transmitted in a scenario which is a hybrid of the scenario of FIG. 3A and the scenario of FIG. 3B. In particular, the scenario of FIG. 4E begins with radio network controller (RNC) $26_1$ downloading an offset value to base station $28_{1\text{-}1}$ as message 4E-1. At an appropriate point in time, the base station $28_{1\text{-}1}$ is notified (via message 4E-2) that the cell involved in the connection is a primary cell. While base station $28_{1\text{-}1}$ remains as the primary base station, the scenario of FIG. 4E resembles that of FIG. 4A. For example, as message 4E-3 radio network controller downloads to base station $28_{1\text{-}1}$ a nominal power level for the DSCH utilized for user equipment unit (UE) 30 in the cell. As in the preceding scenarios, the message 4E-3 is in the user plane frame protocol and thus can carry the DSCH data as well. Event 4E-4 of FIG. 4E shows base station $28_{1\text{-}1}$ computing the actual DSCH power level for the DSCH utilized in the cell by the connection with user equipment unit (UE) 30 by subtracting the power offset value (obtained via message 4E-1) from the nominal power value (obtained via message 4E-3) to determine the actual power level. The power level as determined at event 4E-4 is utilized to set the actual power level of radio transceiver 38. The radio transceiver 38 then transmits the DSCH data from base station $28_{1\text{-}1}$ to user equipment unit (UE) 30 over air interface 32 using the actual power level, as indicated by event 4E-5 in FIG. 4E.

The scenario of FIG. 4E further shows that the cell served by base station $28_{1\text{-}1}$ subsequently changes from being a primary cell to a non-primary or secondary cell for the connection involving user equipment unit (UE) 30. In this regard, FIG. 4E shows user equipment unit (UE) 30 sending a secondary cell status notification message 4E-6 to base station $28_{1\text{-}1}$. As a result of the notification of message 4E-6, as event 4E-8 the DSCH transmission power level controller 110 of base station $28_{1\text{-}1}$ now computes the actual power level for the DSCH in similar manner as the scenario of FIG. 3B and FIG. 4B, e.g., with the actual power level being equated to the nominal power level (as communicated to base station $28_{1\text{-}1}$, for example, by message 4E-7). The radio transceiver 38 then transmits the DSCH data from base station $28_{1\text{-}1}$ to user equipment unit (UE) 30 over air interface 32 using the re-computed actual power level, as indicated by event 4E-9 in FIG. 4E.

Figure 4F:
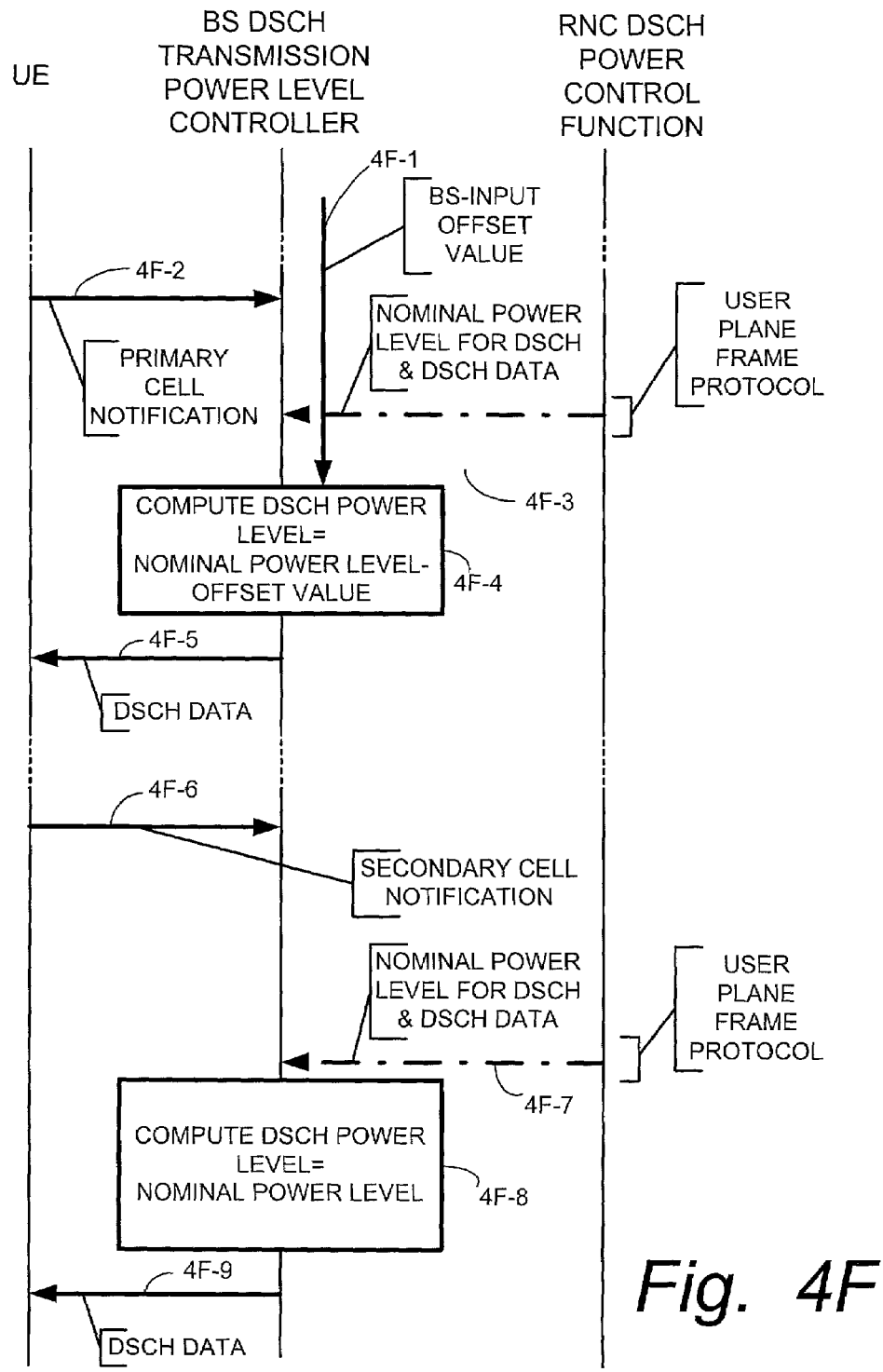
FIG. 4F is a diagrammatic view showing certain example messages transmitted in a scenario which is a hybrid of the scenario of FIG. 3A and the scenario of FIG. 3B, but which also like FIG. 3D shows a base station being configured for base station input of an offset value.

Like the scenario of FIG. 4E, FIG. 4F shows a scenario which is a hybrid of the scenario of FIG. 3A and the scenario of FIG. 3B. In the FIG. 4F scenario, however, the offset value is not received from radio network controller (RNC) $26_1$, but instead (like the scenario of FIG. 3D) is locally input or configured at the base station. As in scenario of FIG. 3D and FIG. 4D, the local input or configuration for the scenario of FIG. 4F is shown as event 4F-1.

Only one offset value message has been illustrated as sent from the radio network controller to the base station in the scenarios described above. The person skilled in the art will understand, however, that the radio network controller may change its previously set power offset value, and thereafter send another message with a different or updated power offset value. Such may occur, for example, in a connection experiencing poor communication quality with the user equipment unit (UE).

Figure 5:
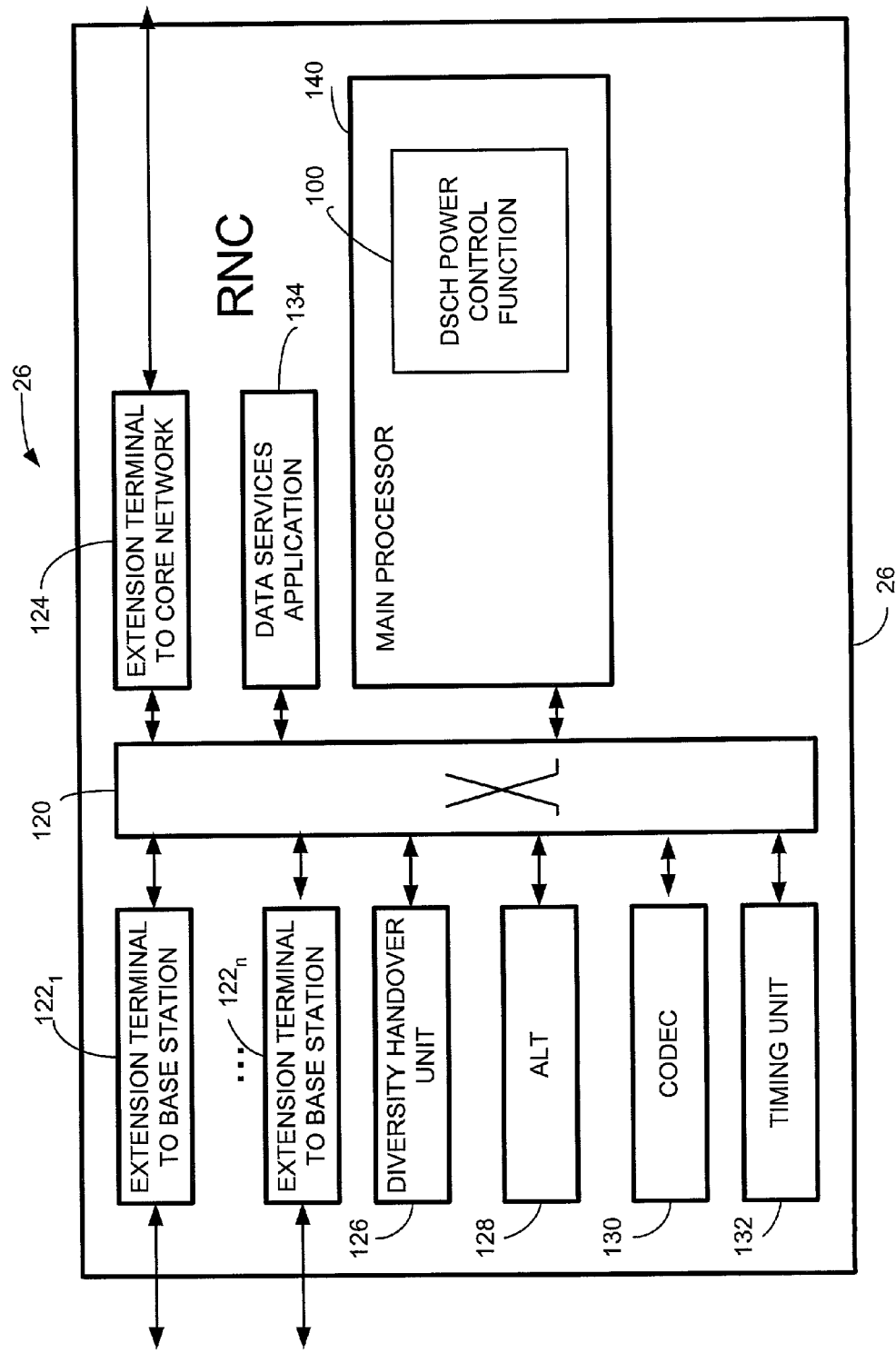
FIG. 5 is a schematic view of an example RNC node in accordance with one embodiment of the invention.

FIG. 5 illustrates, in somewhat more detail, an example non-limiting RNC node 26 of the present invention. It so happens that the RNC node 26 of FIG. 5 is a switched-based node having a switch 120. The switch 120 serves to interconnect other constituent elements of RNC node 26. Such other constituent elements include extension terminals $122_1$ through $122_n$, as well as extension terminal 124. Extension terminals $122_1$ through $122_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; an ALT unit 128; codex 130; timing unit 132; a data services application unit 134; and, a main processor 140. The person skilled in the art will appreciate generally the functions of these constituent elements, it being noted that the ALT unit 128 is a unit which provides, e.g., multiplexing and demultiplexing and (optionally) queuing with regard to differing protocols of cells.

Figure 6:
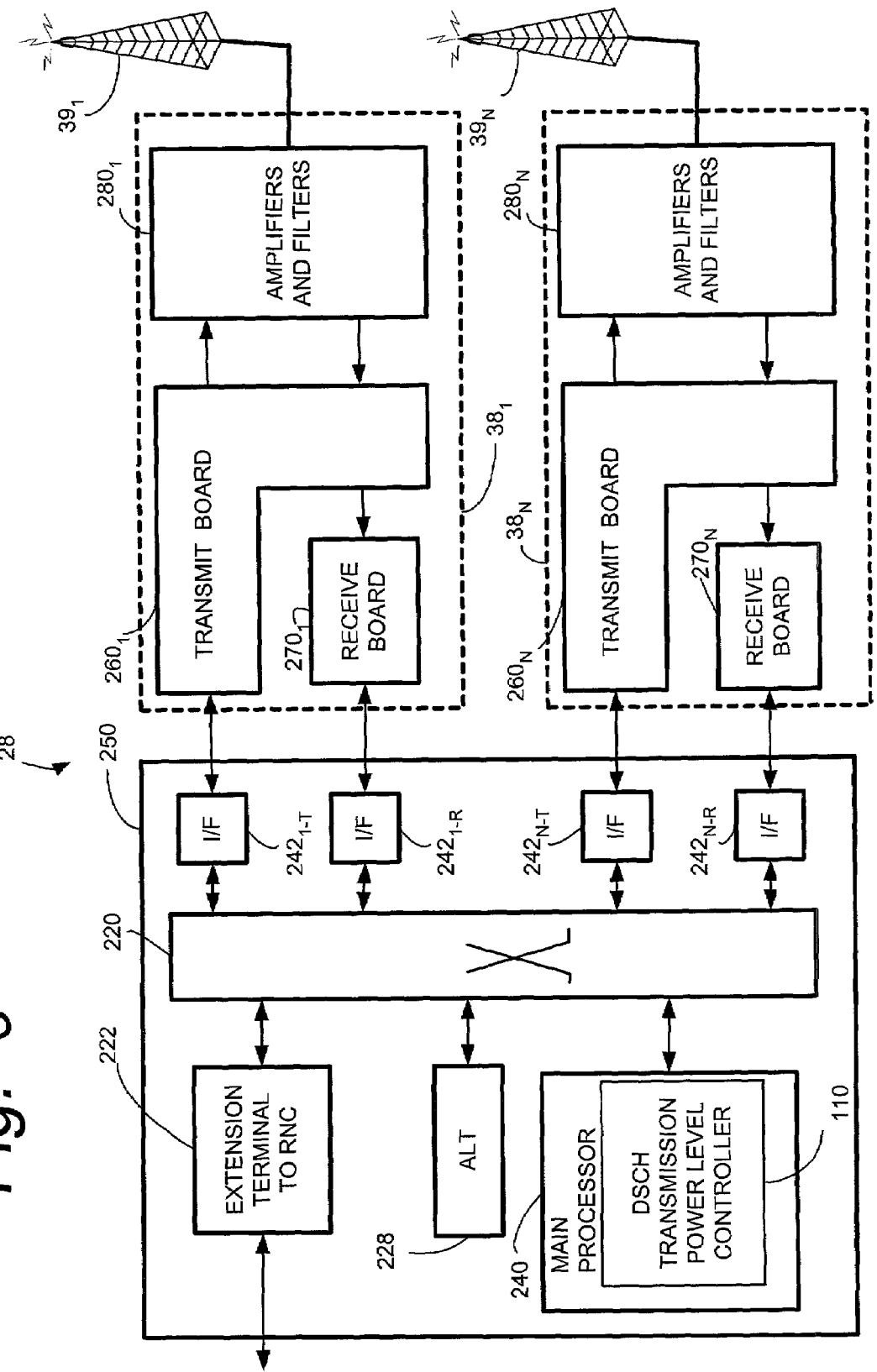
FIG. 6 is a schematic view of an example base station node in accordance with one embodiment of the invention.

FIG. 6 illustrates, in non-limiting manner, more details of an example base station (BS) node 28 in accordance with one embodiment of the present invention. As with RNC node 26, the base station (BS) node 28 of FIG. 6 is a switched-based node having a switch 220 which serves to interconnect other constituent elements of base station (BS) node 28. Such other constituent elements include extension terminal 222; ALT unit 228; BS main processor 240, and interface boards 242.

Extension terminal 222 connects base station (BS) node 28 to radio network controller (RNC) node 26, and thus comprises the Iub interface. As in the case of radio network controller (RNC) node 26, the ALT unit 228 is a unit which provides, e.g., multiplexing and demultiplexing and (optionally) queuing with regard to differing protocols of cells.

The embodiment of base station (BS) node 28 illustrated in FIG. 6 is housed in a rack having multiple subracks. Each subrack has one or more boards, e.g., circuit boards, mounted thereon. A first subrack 250 contains boards for each of extension terminal 222; ALT unit 228; BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board $242_{1-T}$ is connected to transmitter board $260_1$, while interface board $242_{1-R}$ is connected to receiver board $270_1$. The pair of transmitter board $260_1$ and receiver board $270_1$ is, in turn, connected to amplifiers and filters board $280_1$. Similar connections exist for a second pairing of transmitter board $260_2$ and receiver board $270_2$, which interface via interface board $242_{2-T}$ and interface board $242_{2-R}$, respectively. Each transceiver 38 0f FIG. 2 thus comprises a subrack which includes a transmitter board 260, a receiver board 270, and amplifiers and filters board 280.

In one example, non-limiting embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver resources which it shares with receiver board 270. Each receiver board 270 includes unillustrated elements such as an interface connected to its corresponding interface board 242; a decoder; a demodulator; and, a baseband receiver. Each amplifiers and filters board 280 includes amplifiers, such as MCPA and LNA amplifiers.

In the example base station (BS) node 28 of FIG. 6, BS main processor 240 which executes DSCH transmission power level controller 110. For the example radio network controller (RNC) node 26 shown in FIG. 5, main processor 140 executes DSCH power control function 100.

The present invention has many advantages, including the following:

A. Regardless of whether the base station supports the improved DSCH power control scheme or not, the CRNC will always set the same power level of the DSCH in the scheduled data in the user plane. No decision at the CRNC has to be made based on whether or not the base station supports the improved DSCH power control scheme.

B. If the base station does not support the improved DSCH power control scheme, the power level of the DSCH will be set in accordance with the 3GPP Release '99 specifications.

The power level of the DSCH can be set by the CRNC in exactly the same way regardless of whether or not the base station supports the improved DSCH power control scheme. If the base station supports the improved DSCH power control scheme, a lower power level will be used if the DSCH is carried by the primary cell.

The improved DSCH power control scheme is consequently controlled by very few parameters, and can be introduced in a radio access network in a very smooth way.

A vendor can choose to implement the improved DSCH power control scheme already in base stations that otherwise are based on the 3GPP Release '99 specifications by configuring the power offset ($P_{DSCH-primary}$) to be used if the DSCH is carried by the primary cell in the BS (without being signalled from the CRNC).

Further more, a vendor can choose to provide a configuration possibility of the power offset ($P_{DSCH-primary}$) to be used if the DSCH is carried by the primary cell in BS based on the 3GPP Release '4 specifications. This configured power offset would for instance be used if the CRNC does not signal any power offset, e.g. which would be the case if the CRNC is based on the 3GPP Release '99 specifications.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a radio access network of a cellular telecommunications system, the radio access network comprising a radio network controller and a base station, a method comprising:

the radio network controller setting a nominal power level for use by the base station in transmitting over the air interface a common transport channel which transports data for a connection with a user equipment unit, the nominal power level being set independently of whether the base station supports a differentiated power control scheme;

the base station ascertaining from the user equipment unit whether a cell served by the base station is a primary cell or a non-primary cell for the connection, the connection involving plural base stations;

wherein the differentiated power control scheme allows the base station selectively to adjust the nominal power level in accordance with whether the cell served by the base station is the primary cell or a non-primary cell for the connection.

2. For use in a radio access network of a cellular telecommunications system, the radio access network comprising a radio network controller and a base station, a method comprising the radio network controller setting a nominal power level for use by the base station in transmitting over the air interface a common transport channel which transports data for a connection with a user equipment unit, the nominal power level being set independently of whether the base station supports a differentiated power control scheme, the base station transmitting data over the air interface using the common transport channel for the connection at the nominal power level if the cell served by the base station is not a primary cell for the connection or if the base station does not support the differentiated power control scheme;

the base station transmitting data over the air interface using the common transport channel for the connection at a reduced power level which is less than the nominal power level if the base station does support the differentiated power control scheme and if the cell served by the base station is a primary cell for the connection.

3. The method of claim 2, further comprising the radio network controller communicating to the base station an offset value to be used in determining the reduced power level.

4. The method of claim 3, further comprising the radio network controller communicating the offset value in a user plane to the base station.

5. The method of claim 3, further comprising the radio network controller communicating the offset value in a control plane to the base station.

6. The method of claim 2, further comprising configuring locally at the base station an offset value to be used in determining the reduced power level.

7. The method of claim 2, further comprising the radio network controller setting the nominal power level in a user plane frame protocol between the base station and the radio network controller.

8. The method of claim 2, wherein the common transport channel is a Downlink Shared Channel (DSCH) in a Universal Mobile Telecommunications Terrestrial Radio Access Network (UTRAN).

9. For use in a radio access network of a cellular telecommunications system, the radio access network comprising a radio network controller and a base station, a method comprising:

the radio network controller setting a power offset value which is selectively used by the base station in determining a power level for transmitting over the air interface a common transport channel which transports data for a connection with a user equipment unit;

the base station ascertaining from the user equipment unit whether a cell served by the base station is a primary cell for the connection or a non-primary cell for the connection, the connection involving plural base stations;

the base station utilizing the power offset value to determine the power level if the cell served by the base station is the primary cell for the connection; and the base station not utilizing the power offset value to determine the power level if the cell served by is a non-primary cell for the connection.

10. The method of claim 9, further comprising the base station subtracting the power offset value from a nominal power value to determine the power level if the cell is a primary cell for the connection.

11. The method of claim 10, further comprising the radio network controller setting and communicating to the base station the nominal power value for use on the common transport channel for the connection.

12. The method of claim 11, further comprising the radio network controller setting the nominal power level in a user plane frame protocol between the base station and the radio network controller.

13. The method of claim 12, wherein the common transport channel is a Downlink Shared Channel (DSCH) in a Universal Mobile Telecommunications Terrestrial Radio Access Network (UTRAN).

14. The method of claim 9, further comprising the radio network controller communicating the offset value in a user plane to the base station.

15. The method of claim 9, further comprising the radio network controller communicating the offset value in a control plane to the base station.

16. A radio access network of a cellular telecommunications system comprising:

a base station involved in a connection with a user equipment unit and which communicates with the user equipment unit over an air interface, the base station ascertaining from the user equipment unit whether a cell served by the base station is a primary cell or a non-primary cell for the connection, the connection involving plural cells;

a radio network controller which sets a nominal vower level to be used by the base station for transmitting data over the air interface to the user equipment unit via a common transport channel utilized by the connection, the nominal power level being set independently of whether the base station supports a differentiated power control scheme, wherein the differentiated power control scheme allows the base station selectively to adjust the nominal power level in accordance with whether a cell served by the base station is a primary cell or a non-primary cell for the connection.

17. A radio access network of a cellular telecommunications system comprising:

a base station involved in a connection with a user equipment unit and which communicates with the user equipment unit over an air interface;

a radio network controller which sets a nominal power level to be used by the base station for transmitting data over the air interface to the user equipment unit via a common transport channel utilized by the connection, the nominal lower level being set independently of whether the base station supports a differentiated power control scheme;

wherein the base station transmits over the air interface data carried by the common transport channel for the connection at the nominal power level if a cell served by the base station is not a primary cell for the connection or if the base station does not support the differentiated power control scheme;

the base station transmits over the air interface data carried by the common transport channel for the connection at a reduced power level which is less than the nominal power level if the base station does support the differentiated power control scheme and if the cell served by the base station is a primary cell for the connection.

18. The apparatus of claim 17, wherein the radio network controller communicates to the base station an offset value to be used in determining the reduced power level.

19. The apparatus of claim 18, wherein the radio network controller communicates the offset value in a user plane to the base station.

20. The apparatus of claim 18, wherein the radio network controller communicates the offset value in a control plane to the base station.

21. The apparatus of claim 17, further comprising means for configuring locally at the base station an offset value to be used in determining the reduced power level.

22. The apparatus of claim 17, wherein the radio network controller sets the nominal power level in a user plane frame protocol between the base station and the radio network controller.

23. The apparatus of claim 17, wherein the common transport channel is a Downlink Shared Channel (DSCH) in a Universal Mobile Telecommunications Terrestrial Radio Access Network (UTRAN).

24. A radio access network of a cellular telecommunications system comprising:
a base station involved in a connection with a user equipment unit and which communicates with the user equipment unit over an air interface;
a radio network controller which sets a power offset value which is selectively used by the base station in determining a power level for transmitting data over the air interface to the user equipment unit via a common transport channel in a cell used by the connection;
the base station utilizing the power offset value to determine the power level if the cell is a primary cell for the connection; and the base station not utilizing the power offset value to determine the power level if the cell is a non-primary cell for the connection;
wherein the base station ascertains from the user equipment unit whether the cell is the primary cell for the connection or a non-primary cell for the connection, the connection involving plural base stations.

25. The apparatus of claim 24, wherein the base station subtracts the power offset value from a nominal power value to determine the power level if the cell is a primary cell for the connection.

26. The apparatus of claim 25, wherein the radio network controller sets and communicates to the base station the nominal power value for use on the common transport channel for the connection.

27. The apparatus of claim 26, wherein the radio network controller sets the nominal power level in a user plane frame protocol between the base station and the radio network controller.

28. The apparatus of claim 24, wherein the common transport channel is a Downlink Shared Channel (DSCH) in a Universal Mobile Telecommunications Terrestrial Radio Access Network (UTRAN).

29. The apparatus of claim 24, wherein the radio network controller communicates the offset value in a user plane to the base station.

30. The apparatus of claim 24, wherein the radio network controller communicates the offset value in a control plane to the base station.

* * * * *